United States Patent Office 2,991,264
Patented July 4, 1961

2,991,264
METHOD OF PARTIALLY CRYSTALLIZING AN ALPHA-OLEFIN POLYMER
George Clarke Monroe, Jr., and Daniel James Vaughan, Orange, Tex., assignors to E. I. du Pont de Nemours and Company, Wilmington, Del., a corporation of Delaware
No Drawing. Filed May 1, 1957, Ser. No. 656,202
8 Claims. (Cl. 260—32.6)

This invention relates to nucleation of crystallizable thermoplastic polymeric materials and particularly to nucleation of polyethylene and other partially crystallizable alkene-1 polymers by incorporating small amounts of solid additives therein.

For many years it has been known that fillers such as titania, zinc oxide, carbon black, silica and the like could be incorporated in polyethylene and other thermoplastic materials to produce desirable characteristics, such as opacity, increased stiffness, etc. Usually these fillers also had the undesirable effect of decreasing toughness. More recently, it has been reported that when silica is employed as a filler for polyethylene, the composition is especially well suited for certain uses when the particle size is submicroscopic, e.g. approximately 50 millimicrons as a maximum.

The quantity of filler employed in these previously known applications has been quite substantial, namely about 5 to 80% of the weight of polyethylene or other resin (cf. British Patents 532,665 and 729,669).

The present invention is based upon the discovery of a phenomenon which is functionally unrelated to these previously known effects of fillers. Actually, the phenomenon which the present applicants have discovered occurs even when the quantity of additive is too small to produce any of the effects normally associated with fillers.

It has been discovered in accordance with this invention that solid particles having diameters of less than about 1 micron, but most effectively below 500 millimicrons, and preferably 1 to 20 millimicrons, when present to the extent of not more than 0.5%, preferably not more than 1000 parts per million (wt.), in molten polymeric material capable of partial crystallization, have a pronounced effect on polymer properties, especially those properties which are related to the rate of crystallite and spherulite growth.

Among the properties which are affected by this phenomenon are toughness and the frictional properties of the polymer surfaces. This in itself is an unexpected discovery. In contrast with previous experience, it is now found that additives which control crystallization can be used, in the quantities herein disclosed, to control the surface properties of polymer films.

The preferred additives which are effective in the practice of this invention are of a siliceous character, such as modified silicas, and silicates. Suitable forms of siliceous solids are available commercially and are characterized by ultimate particle sizes in the 5 to 10 millimicron range. Estersils, i.e. supercolloidal amorphous silica coated with alkoxy groups, are quite suitable. Other solids which have been found effective when present in the form of particles of about this same size are silica (e.g. supercolloidal amorphous hydrophilic silica), ammonium perfluoroheptane carboxylate, alumina, sodium chloride, calcium chloride, potassium bromide, calcium carbonate, monosodium phosphate, disodium phosphate, aluminum trichloride, potassium nitrate, aluminum phosphate, aluminum acetate, aluminum sulfate, and sodium sulfate. It is apparent that the substances which have the desired effect are solid under the polymer crystallization conditions and are further characterized by insolubility in the polymer, small (preferably colloidal or supercolloidal) ultimate size of particle, and chemical inertness, i.e. stability under the conditions of crystallization.

If desired, other additives may also be present, such as oleamide, ethylene distearamide, or other fatty acid amides. The quantity of amide may be from 0.01% to 0.5% (wt.) of polyethylene or other hydrocarbon polymer.

The polymers which are employed most effectively in the practice of this invention are those which form very viscous melts. The latter class of polymers is exemplified by polymers of olefinic hydrocarbons having terminal ethylenic unsaturation, e.g. the alkene-1 polymers (i.e. alkene-1 homopolymers, and copolymers from alkene-1 monomers as sole components), which are partially crystallizable. Specific examples are branched polyethylene, ethylene-higher alkene-1 copolymers, polypropylene, linear polyethylene, crystallizable polystyrene, diene polymers which are crystallizable in an unstressed condition, and crystallizable hydrocarbon polymers in general.

The invention can best be illustrated with branched polyethylene, and it is to be understood that the procedures described hereinbelow can be used with other polymers.

In polyethylene, the additives improve block, brittleness, haze and transparency to a marked extent and also improve other properties, such as slip, in many instances.

From the practical and theoretical standpoint it is especially noteworthy that haze is improved, since this implies the formation of smaller more uniform crystallites and spherulites.

The fact that both transparency and blocking properties can thus be improved is quite remarkable because transparency in branched polyethylene is known to be a surface phenomenon, and one would expect improved transparency to be generally associated with poorer blocking properties (smoother surfaces). The present invention is thus extremely valuable in that it provides a method for improving both transparency and blocking tendency, simultaneously. A probable explanation is that the surface, though smoother, has less tack, i.e. the phenomenon may be associated with a decreased surface tackiness, evidently resulting from a more rapid crystallization, due to the more numerous heterogeneous nuclei which have been introduced into the composition.

The improvement in brittleness is also highly valuable and is probably associated with the decreased size and increased degree of uniformity of the crystal structure, which prevents planes of cleavage from occurring in extruded film, for example.

Various methods may be employed for introducing the additive into the polymer. One suitable method is to introduce the additive during or prior to polymerization. Another is to prepare a concentrate of the additive in the polymer, mill it in a Banbury mill, subdivide the resulting concentrate by means of a cube-cutter or similar device, dry-blend the concentrate with more polymer, and extrude the blend in a suitable mixer-extruder. Another method is to prepare a concentrate by means of a Banbury mixer, completing the dispersion in such a mixer at elevated temperature (105°–135° C.) for a suitable period (e.g. 15 minutes); the product can be directly extruded and, if desired, finely subdivided in any suitable device. Any of the other conventional methods of mixing, such as through the use of liquid media as mixing aids, may be employed.

An essential step, however, in preparing the compositions of this invention is quenching of the molten material after mixing, since it is this crystallization step which produces the desirable results hereinabove described. The quenching can take place in any suitable apparatus, such as by the use of cooling rolls in contact with molten extruded film, etc. The quenching can be achieved by contact with a cool fluid, such as air or a liquid. The temperature after quenching should be below 100° and preferably not above 95° C. (the molten resin being at 105° to 300° C.). In a particular embodiment quenching can take place on a substrate, such as a paper base, in contact with a rubber roll pressing against the paper, the molten film being also pressed against the paper by a smooth-surfaced metal quenching roll, the paper and molten film meeting at the nip of these rolls.

The invention is illustrated further by means of the following examples.

EXAMPLE 1

2500 grams of branched polyethylene ("Alathon" 10 polyethylene resin, manufactured by Du Pont) was dry blended with 2.5 grams of an estersil (namely butanol-modified silica having an ultimate particle size of 8 to 10 milli-microns and prepared by the method of U.S. Patent 2,657,149), and the resulting mixture was further worked in a Banbury mixer at 125° to 130° C. for 10 minutes. The resulting product was subdivided in a Wiley mill and extruded into film. The extrusion was performed on a 1½ inch extruder equipped with blown film die and take-up assembly. The conditions of extrusion were:

| | |
|---|---|
| Melt temperature | 175. C. |
| Throughput | 130 grams/min. |
| Blow ratio | 1.65. |
| Take-up rate | 21.5 ft./min. |
| Quench air temperature | 32° C. |
| Quench air pressure | .6 inch water. |
| Film thickness | 1.5 mils. |

For comparison, polyethylene of the same lot was similarly worked, subdivided and extruded, but in the absence of additive. In another control run, the unmodified polyethylene was treated in the absence of the additive and without "Banburying." The following table records a description of the film obtained in each instance.

*Table I*

EFFECT OF 1000 P.P.M. ESTERSIL ON POLYETHYLENE CRYSTALLIZATION

| Composition | Transparency[1] | Haze,[2] percent | Brittleness[3] | Block,[4] lbs. | Slip[5] |
|---|---|---|---|---|---|
| Resin+estersil | 425–450 | 6 | 21 | 0.52 | 1.2 |
| Resin, without additive | 310–350 | 8.6 | 40 | 0.87 | 1.5 |
| Same, without "Banburying" | 200–250 | 11.3 | 46 | 0.92 | 1.3 |

[1] American Optical Company Meter (arbitrary scale).
[2] Gardner Hazemeter.
[3] Rating 0–50, 50 indicating all failures were brittle.
[4] Force required to peel apart two 2 inch x 4 inch sections of films.
[5] Coefficient of sliding friction.

EXAMPLE 2

A concentrate was prepared by working a dry blend of 250 grams of branched polyethylene and 10 grams of hydrophilic silica having an ultimate particle size of 8 to 20 millimicrons. The blend was milled at 105°–135° C. for 15 minutes in a Banbury mixer. The extrudate from the mixer was cooled and finely subdivided in a Wiley mill. The resulting concentrate was then dry-blended with cube-cut branched polyethylene to obtain four blends for extrusion at concentrations set forth in Table II. The four blends of cubes and concentrate were extruded into films under the same conditions as described in Example 1, with the results set forth in Table II.

*Table II*

EFFECT OF VARYING THE NUMBER OF NUCLEI ON PROPERTIES OF CRYSTALLIZED POLYETHYLENE (SILICA AS ADDITIVE)

| Blend No. | Transparency | Haze, percent | Brittleness | Block | Slip |
|---|---|---|---|---|---|
| 1 (100 p.p.m. silica) | 285 | 8.7 | 39 | 0.65 | 1.26 |
| 2 (250 p.p.m. silica) | 309 | 5.2 | 19 | 0.26 | 1.51 |
| 3 (500 p.p.m. silica) | 325 | 4.1 | 23 | 0.30 | 1.40 |
| 4 (1000 p.p.m. silica) | 326 | 4.2 | 30 | 0.21 | 1.33 |
| Control | 262 | 11.0 | 46 | 0.87 | 1.20 |

EXAMPLE 3

Example 2 was repeated using the estersil of Example 1 in place of the silica composition of Example 2. The results are reported in Table III.

*Table III*

EFFECT OF VARYING THE NUMBER OF NUCLEI ON PROPERTIES OF CRYSTALLIZED POLYETHYLENE (ESTERSIL AS ADDITIVE)

| Quantity of Additive, p.p.m. | Transparency | Haze, percent | Brittleness | Block | Slip |
|---|---|---|---|---|---|
| 100 | 272 | 10.6 | 38 | 0.53 | 1.3 |
| 500 | 365 | 4.2 | 26 | 0.12 | 1.1 |
| 1,000 | 378 | 3.7 | 23 | 0.14 | 1.0 |
| Control | 261 | 11.0 | 42 | 0.72 | 1.3 |

The effect of the additives in each of the foregoing examples on crystallization of polyethylene film, as determined by measurement of density, crystallization rate at 95° C. and equilibrium level of crystallinity at 95° C., was determined with results recorded in Table IV.

*Table IV*

EFFECT OF ADDITIVES ON CRYSTALLIZATION OF POLYETHYLENE

| Sample | Film Density, gm./cc. | 95° C. | | Equilibrium Level of Crystallinity, 95° C., percent |
|---|---|---|---|---|
| | | Time of Nucleation, Sec. | Rate of Crystallization, Percent/Min. | |
| Method of Example 1: | | | | |
| 1. (1000 p.p.m. estersil) | .9219 | 1.2 | 168 | 21.3 |
| 2. Banburyed "Alathon" 10 | .9203 | 3.6 | 136 | 21.8 |
| 3. Control "Alathon" 10 | .9180 | 6.5 | 109 | 21.3 |
| Method of Examples 2 and 3: | | | | |
| 1. (100 p.p.m. silica) | .9193 | 3.8 | 133 | 21.3 |
| 2. (250 p.p.m. silica) | .9225 | 1.3 | 169 | 21.6 |
| 3. (500 p.p.m. silica) | .9224 | 1.2 | 172 | 21.1 |
| 4. (1000 p.p.m. silica) | .9220 | 1.4 | 175 | 21.1 |
| Control for 1–4 | .9183 | 6.4 | 110 | 21.3 |
| 5. (100 p.p.m. estersil) | .9210 | 2.9 | 126 | 21.7 |
| 6. (500 p.p.m. estersil) | .9223 | 1.3 | 165 | 21.2 |
| 7. (1,000 p.p.m. estersil) | .9224 | 1.2 | 162 | 21.4 |
| Control for 5–7 | .9181 | 6.5 | 108 | 21.3 |

The "Time of Nucleation" referred to in the foregoing table is the time which elapses at 95° C. before observable crystallization commences. The "Rate of Crystallization" is the rate of change in crystallinity, in percent crystallinity per minute, between 25% of the equilibrium level of crystallinity and 50% of the equilibrium crystallinity.

Blown films made by the methods of Examples 1–3, when tested by a plurality of methods, were shown to have toughness considerably greater than that of the controls.

EXAMPLE 4

A sample of linear polyethylene had a density (annealed 1 hr.) of .9566 and a stiffness of 96,700 p.s.i. After milling on a rubber mill, it had a density of .9573, When similarly milled in the presence of 400 p.p.m. of estersil, the density reached .9582 (stiffness 112,800 p.s.i.), and when 1000 p.p.m. of estersil was employed, the density was .9582. In a similar experiment using linear polyethylene from the same source, and using 1000 p.p.m. of alumina (particle size ca. 20 millimicrons) in place of the added estersil, the product had a density of .9583, and a stiffness of 112,100. Stiffness was a density-determined property in this experiment.

EXAMPLE 5

Polyethylene containing 300 p.p.m. of oleamide was mixed with 1000 p.p.m. of the estersil of Example 1 in a "Ko-Kneader" mixing device, and the resulting mixture was converted to a blown film, which was air quenched from a melt temperature of 175° C. to below 100° C. The film was transparent and had about one-half of the haze of film similarly made from the oleamide-polyethylene mixture without the added estersil.

EXAMPLE 6

Partially crystalline polypropylene having a density of 0.9013 was milled, in a molten state, with 1000 p.p.m. of the estersil employed in Example 1, until a uniform mixture was obtained. The resulting product, after cooling to ordinary temperature, had a density of 0.9040, as measured under the same conditions as the initial density. The increased density was accompanied by a decrease in spherulite size and an increase in total crystallinity.

The examples hereinabove described are illustrative only, and it is to be understood that many different ways of practicing the invention will occur to those who are skilled in the polymer art. Thus, the invention may be practiced by using particle sizes of larger diameter than the sizes illustrated although this results in disadvantages. When alumina, silica, and calcium carbonate were used in particle sizes of 2 to 5 microns, the slip and block properties of polyethylene were improved, but the particles were detectable in the film by the naked eye, i.e. the appearance was adversely affected.

Moreover, it is to be understood that there are various known expedients for controlling the size and even the shape of solid additives, as well as a wide variety of commercial solid materials which are stable and which have various forms or shapes of the desired particle size. One method for producing particles of small size is to choose an additive, such as rosin, which is soluble in the molten resin, or liquid at the temperature of the molten resin, and which crystallizes at about the same temperature as the resin. In the latter situation crystals of the additive necessarily go through an initial stage of growth which is characterized by extremely minute crystals, hence the additive necessarily has crystals of suitable size in the environment wherein the nucleation occurs. Among the stable commercial materials having known particle size, some also have characteristic dimensions, and it is thus possible to vary or control the shape, i.e. dimensions, of the particles of additive, which in some instances appears to be desirable. Thus, silica particles are frequently spherical, while alumina particles can be obtained in the form of needles. Magnesium oxide platelets 5 millimicrons thick and 500 millimicrons across are also effective. Thus, it is apparent that while in some instances the configuration or shape of the crystalline additive may be a significant determinant of crystallite or spherulite size in the crystallizable resin, the phenomenon of nucleation is not limited to any particular shape or crystal form, but is encountered with crystals of the widest variety of shape or form.

Although both hydrophilic and hydrophobic siliceous materials are highly effective in the practice of this invention, the results hereinabove described are especially surprising in those embodiments employing hydrophilic solids, as distinguished from such organophilic solids as estersils. Polyethylene films containing estersils have been known heretofore, and it was known that they exhibit extraordinary clarity, even at loadings of 10% by weight, or higher. The present invention is concerned with a method which makes possible the use of other colloidal solids in producing clear products, although the quantities of these other solids are limited, i.e. not as large as those which may be used in clear estersil-polyethylene compositions. This method is based on nucleation, where clarity in polyethylene containing heavy loadings of estersils evidently is the result of other phenomena, in addition to nucleation.

The invention is highly useful in improving the quality (clarity, frictional properties and strength) of polymeric films, shaped objects, fibers, and the like where such improvement reflects faster crystallization, smaller crystalline domains, and higher levels of crystallinity for given time-temperature treatments of the polymers hereinabove mentioned.

We claim:

1. The method of partially crystallizing a partially crystallizable polymer selected from the class consting of branched polyethylene, linear polyethylene, polypropylene, and copolymers of ethylene with higher 1-olefins, which comprises intimately mixing said polymer with solid particles having a particle size of from 1 micron to 1 millimicron, melting the said polymer in the mixture, and quenching said mixture at crystallization temperature, said particles while dispersed in the molten polymer being solid, insoluble in the polymer, and chemically stable, and said particles being from 250 p.p.m. to not in excess of about 1000 p.p.m. by weight of said polymer, whereby the rate of crystallization of said polymer is enhanced.

2. The method of partially crystallizing a partially crystallizable polymer of the class consisting of branched polyethylene, linear polyethylene, polypropylene, and copolymers of ethylene with higher 1-olefin which comprises intimately mixing said polymer with solid particles having a particle size of from 1 micron to 1 millimicron, heating said mixture to the molten state, and quenching said mixture at crystallization temperature, said particles while dispersed in the molten polymer being solid, insoluble in the polymer, and chemically stable, and said particles being from 250 p.p.m. to not in excess of about 1000 p.p.m. by weight of said polymer, whereby the rate of crystallization of said polymer is enhanced.

3. The method of partially crystallizing polyethylene according to claim 1 which comprises intimately mixing molten polyethylene with from 250 to 1000 parts by weight of an estersil having a particle size of from 1 to 20 millimicrons per million parts of said polyethylene, and quenching the mixture at crystallization temperature whereby the rate of crystallization of said polyethylene is enhanced.

4. The method of partially crystallizing polyethylene according to claim 1 which comprises intimately mixing molten polyethylene with from 250 to 1000 parts by weight of a hydrophilic silica having a particle size of 1 to 20 millimicrons per million parts of said polyethylene and quenching the mixture at crystallization temperature, whereby the rate of crystallization of said polyethylene is enhanced.

5. Method of claim 1 wherein the said hydrocarbon polymer is polyethylene.

6. The method of claim 3 wherein the temperature of the polyethylene before cooling is 105° to 300° C., and after cooling is below 100° C.

7. The method of claim 3 wherein the said polyethylene contains 0.01 to 0.5% of fatty acid amide.

8. Method of claim 1 wherein the said hydrocarbon polymer is propylpropylene.

(References on following page)

References Cited in the file of this patent

UNITED STATES PATENTS

| | | |
|---|---|---|
| 2,728,740 | Iler | Dec. 27, 1955 |
| 2,751,366 | Braendle | June 19, 1956 |
| 2,770,609 | Symonds | Nov. 13, 1956 |

FOREIGN PATENTS

| | | |
|---|---|---|
| 771,955 | Great Britain | Apr. 10, 1957 |

OTHER REFERENCES

High Polymers, volume XI, page 173, Polyethylene, by Raff and Allison, Interscience Publishers, Inc., New York.

UNITED STATES PATENT OFFICE
CERTIFICATE OF CORRECTION

Patent No. 2,991,264                                July 4, 1961

George Clarke Monroe, Jr., et al.

It is hereby certified that error appears in the above numbered patent requiring correction and that the said Letters Patent should read as corrected below.

Column 4, Table III, column 5, line 4 thereof, for "0.72" read -- 0.73 --.

Signed and sealed this 21st day of November 1961.

(SEAL)
Attest:

ERNEST W. SWIDER                             DAVID L. LADD
Attesting Officer                                Commissioner of Patents

USCOMM-DC